March 28, 1961
W. H. FRAZEL
2,976,740
TELEMETRIC RECEIVER
Filed May 11, 1959
2 Sheets-Sheet 1
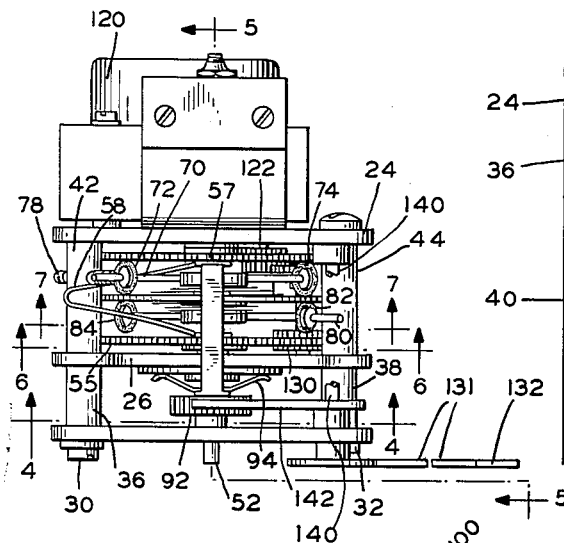
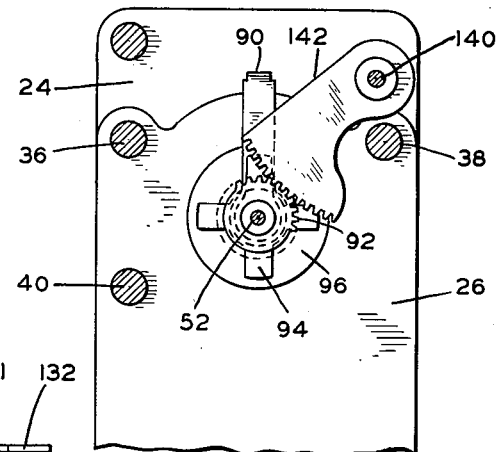
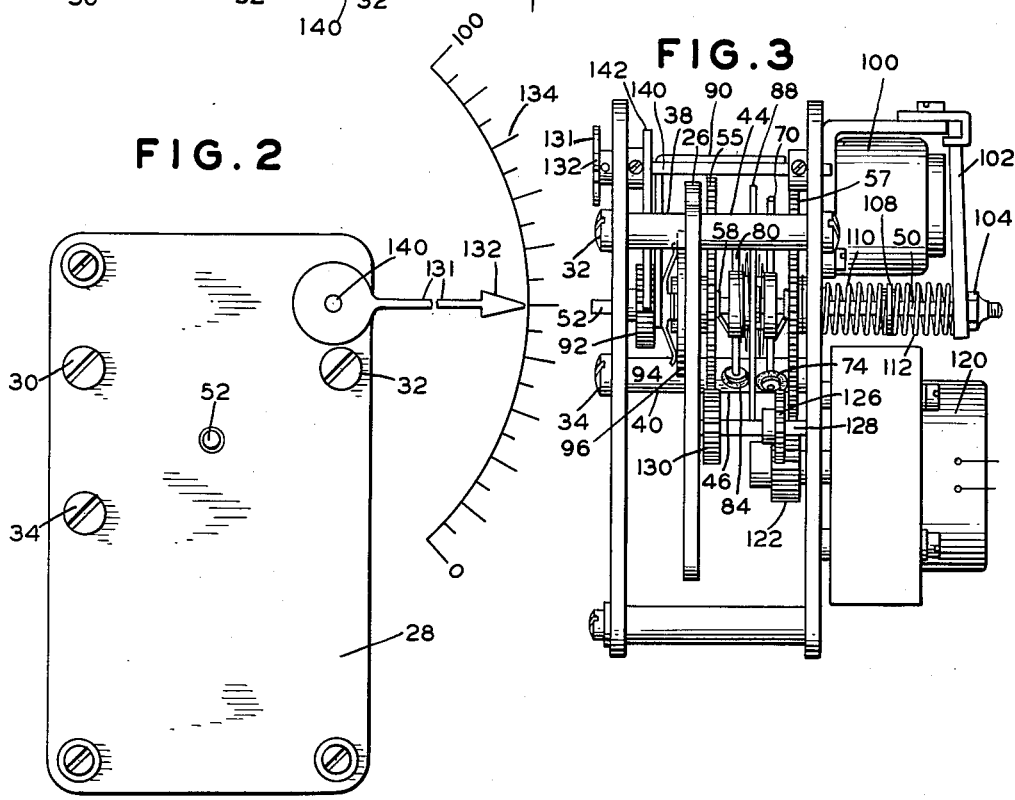

March 28, 1961
W. H. FRAZEL
2,976,740
TELEMETRIC RECEIVER
Filed May 11, 1959
2 Sheets-Sheet 2
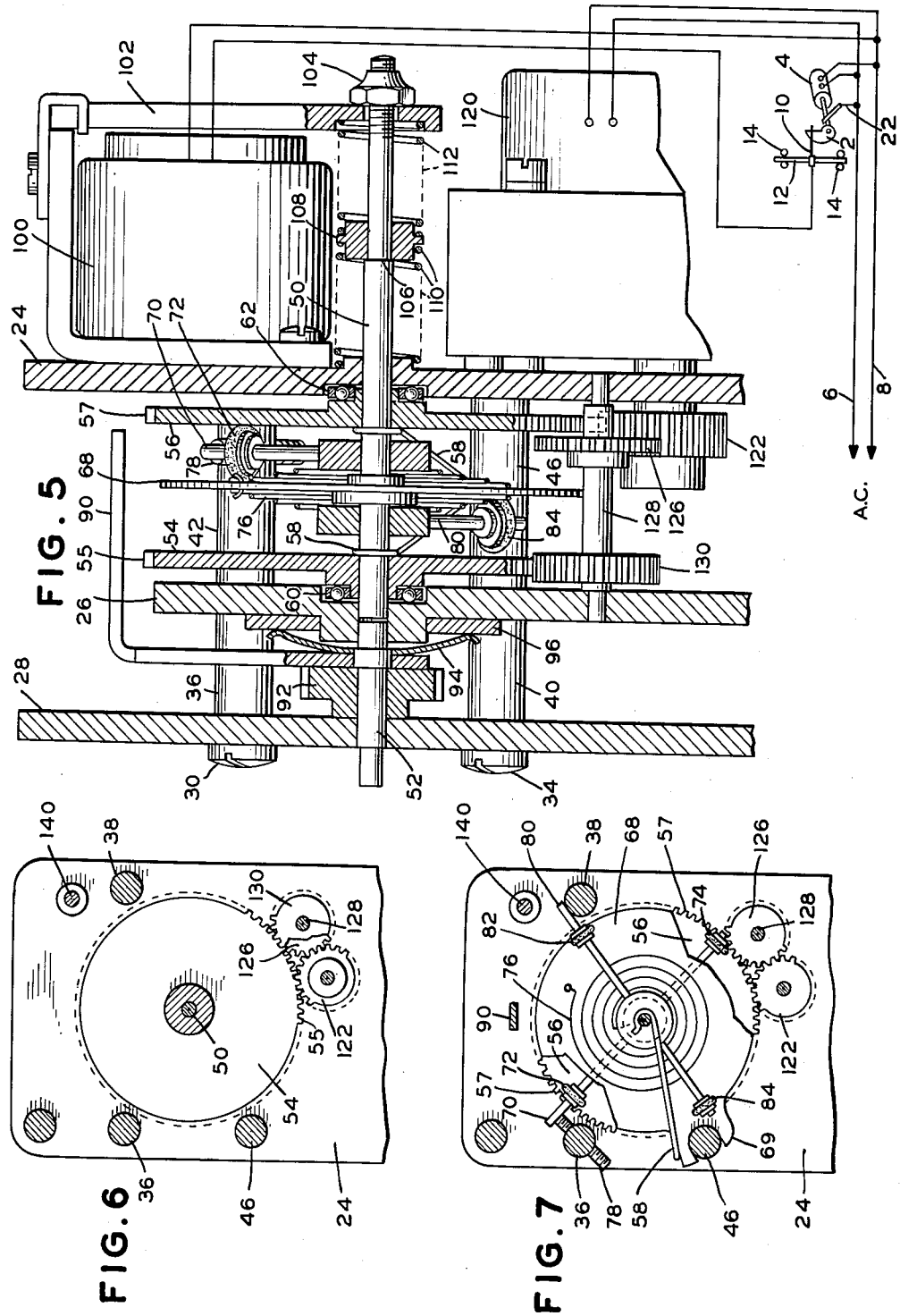

United States Patent Office 2,976,740
Patented Mar. 28, 1961

2,976,740

TELEMETRIC RECEIVER

Wilbur H. Frazel, East Providence, R.I., assignor to B-I-F Industries, Inc., Providence, R.I., a corporation of Rhode Island Filed May 11, 1959, Ser. No. 812,203

8 Claims. (Cl. 74—319)

This invention relates to telemetering and, more particularly, to a receiver for use in a telemetering system. The invention is particularly concerned with telemetering systems of the "impulse-duration" type wherein there is customarily employed a transmitter having a cam continuously rotatable at substantially constant speed and cooperating with contact means for sending in each of successive cycles of rotation of the cam an electrical impulse of a duration corresponding to a variable magnitude, such as, rate of flow, temperature, or pressure.

Telemetering systems to detect and to indicate variations in magnitude of a variable, such as, rate of flow, temperature, or pressure, have been in use for some time. Such systems conventionally include a transmitter on or in the immediate vicinity of the variable to be measured and a receiver at some remote point, the receiver being connected to the transmitter by wires or other suitable means. In such systems an impulse proportional to the magnitude of the variable is generated at the transmitter and sent to the receiver where the impulse is translated by the receiver into some form of visual or recorded reading, such as on a gauge, dial, chart, tape, or the like. To assure prompt and accurate indications of the instantaneous magnitude of the variable measured, it is desirable that the receiver be light in weight and compact and, at the same time, be sufficiently sturdy in construction to withstand abrupt changes occasioned by sudden fluctuation in the magnitude of the variable.

It is an object of this invention to provide an improved telemetering receiver.

It is a further object of this invention to provide such a receiver which is compact and light in weight.

It is a still further object of the invention to provide an improved telemetering receiver for use in an "impulse-duration" system.

These and other objects of the invention will be readily apparent from the following description and the accompanying drawings, in which:

Fig. 1 is a top plan view of the device of the invention;

Fig. 2 is a front view of the device of Fig. 1;

Fig. 3 is a side view of the device of Fig. 1;

Fig. 4 is a view along the line 4—4 of Fig. 1;

Fig. 5 is a view, partly in section, along the line 5—5 of Fig. 1, and showing, diagrammatically, the telemetering circuit;

Fig. 6 is a view along the line 6—6 of Fig. 1; and

Fig. 7 is a view along the line 7—7 of Fig. 1.

Referring to the drawings, the invention is shown in connection with a telemetric receiver, connected to an electrical circuit which includes a transmitter of any suitable or well-known type. As shown in Fig. 5, the transmitter comprises a cam 2 which is continuously rotated at substantially constant speed by a constant speed motor 4 connected to a suitable source by leads 6, 8. A contactor 10, engageable by the face of cam 2 during each cycle of rotation of the latter, is carried by a rod 12 vertically movable between pairs of rollers 14, the rod 12 being vertically positioned between the rollers in accordance with the instantaneous magnitude of the variable being measured, for example, pressure, temperature, or rate of flow of a liquid. Current from lead 6 is fed to cam 2 through lead 22.

In each cycle of rotation of the transmitter cam 2, a circuit is closed through contactor 10, for a time proportionate to the duration of engagement between the cam and the contactor 10 or, in other words, for a time corresponding to the magnitude of the variable to be measured in accordance with which the contactor is positioned. During the remainder of the cycle of rotation of the cam, the contactor 10 is out of engagement with cam 2 and, hence, the circuit is de-energized.

As best shown in Figs. 1, 3 and 5, the receiver apparatus comprises suitable frames 24, 26, 28, held in fixed spaced relationship by bolts 30, 32, 34 and spacers 36, 38, 40 and 42, 44, 46. A shaft 50, mounted for axial movement in frames 24, 26, is in axial alignment with shaft 52, mounted in fixed position for rotation in frames 26, 28, a clearance being provided between the abutting ends of the shafts 50, 52 to allow axial movement of the shaft 50 toward and away from the shaft 52. Intermediate the frames 24, 26 rotatable driving plates 54, 56, provided at their respective peripheries with gear teeth 55, 57, are rotatably mounted on shaft 50 and are slidable thereon, a U-shaped spring 58 being positioned between the plates 54, 56 urging the plates toward frames 24 and 26 respectively. Plate 54 is provided with a thrust bearing 60 mounted in a recess in the housing 26 and plate 56 is provided with a thrust bearing 62 mounted in a recess in frame 24. A stationary plate 68, fixed to shaft 50 and movable axially therewith is mounted intermediate the rotatable plates 54, 56.

An arm 70 is rotatably supported on shaft 50 intermediate plate 56 and stationary plate 68 and is provided adjacent its outer ends with wheels 72, 74. The wheels 72, 74 are mounted in fixed position for rotation on arm 70 and are equidistantly spaced from shaft 50, arm 70 extending beyond the wheel 72 for reasons more particularly pointed out hereinafter. A spiral spring 76 is attached at one of its ends to plate 68 and at its opposite end to the arm 70, spring 76 urging arm 70 toward stop 78 adjustably mounted on spacer 42. A second arm 80 is rotatably mounted on shaft 50 intermediate plate 54 and plate 68 and is provided adjacent its opposite ends with wheels 82, 84. Wheels 82, 84 are mounted in fixed position for rotation on arm 80 and are equidistantly spaced from shaft 50, arm 80 extending beyond wheel 82 for reasons more clearly set forth hereinafter. A spiral spring 86 is connected at one of its ends to plate 68 and at its opposite end to arm 80, spring 86 urging arm 80 toward spacer 44 which serves as a stop for arm 80.

An L-shaped member 90 is keyed at one of its ends to shaft 52 and at its opposite end extends over frame 26 and between the outer extensions of arms 70 and 80. A gear 92 is keyed to shaft 52 at one side of arm 90 and, at the opposite side of arm 90, shaft 52 is provided with a leaf spring 94 bearing at its outer end on a plate 96 carried on frame 26, spring 94 acting as a friction brake to hold shaft 52, arm 90 and gear 92 in position as will be more fully explained hereinafter.

A solenoid 100 is fixed to the outer face of the frame 24 and is provided with an armature 102 hinged at one of its ends to the stationary frame of the solenoid 100, the armature 102 engaging a nut 104 affixed to the outer end of shaft 50. Intermediate the nut 104 and housing 24, shaft 50 is provided with a shoulder 106, a ring 108 being slidably mounted on the outer end of shaft 50 for seating against shoulder 106. Intermediate housing 24 and ring 108 a compression spring 110 is mounted on shaft 50 and a second compression spring 112 is mounted on shaft 50 intermediate the ring 108 and armature 102, the spring 112 being seated at its outer end in a recess in armature 102. It is preferred, for reasons which will be more apparent hereinafter, that the compression load applied by spring 112 be twice that applied by spring 110. A spring rate of approximately 2 lbs. per inch has been found satisfactory for spring 112, and a spring rate of approximately 1 lb. per inch for spring 110.

A constant speed motor 120 provided with a gear 122 is mounted on the back of frame 24, the motor 120 being connected to leads 6 and 8. Gear 122 is meshed with teeth 57 on the periphery of rotatable plate 56 and with gear 126 carried on counter-shaft 128 rotatably mounted on frames 24, 26. A gear 130 keyed to shaft 128 is in engagement with teeth 55 on the periphery of rotatable plate 54.

In operation, motor 120 drives plates 54 and 56 at constant speed, plate 54 being turned in a counterclockwise direction as viewed from frame 28 and plate 56 turning clockwise, plates 54 and 56 both turning at the same speed. As best shown in Fig. 7, plate 68 is provided with a fork-shaped extension 69 which engages spacer 46, preventing rotation of plate 68 and shaft 50 to which plate 68 is attached. The faces of plates 54, 56 and stationary plate 68, contacted by the wheels 72, 74, 82, 84 are smooth, preferably being finished to a mirror-like surface in the area contacted by wheels 72, 74, 82, 84, and wheels 72, 74, 82, 84 are each provided with a periphery of friction material, such as rubber, neoprene, or the like.

Shaft 50 and stationary plate 68, through the action of springs 110, 112, are urged to the right, as shown in Fig. 5, toward plate 56, gripping wheels 72, 74 between driving plate 56 and stationary plate 68, rotation of the plate 56 rotating the wheels 72, 74, driving the arm 70 in a clockwise direction. As the arm 70 is driven in a clockwise direction the extension of arm 70 contacts one side of member 90, rotating member 90, shaft 52 and motor 92 in a clockwise direction. Actuation of solenoid 100 moves armature 102 to the left, as shown in Fig. 5, armature 102 moving shaft 50 and stationary plate 68 to the left, away from driving plate 56 and toward driving plate 54, freeing arm 70 and gripping wheels 82, 84 of arm 80 between driving plate 54 and stationary plate 68. On release of arm 70, spring 76 returns arm 70 to stop 78, spring 94 holding arm shaft 52, arm 90 and gear 92 positioned. Gripping of wheels 82, 84 between plates 54, 68 causes arm 80 to be driven away from stop 32 in a counterclockwise direction. As the arm 80 moves counterclockwise, the extension of arm 80, if the arm 80 is rotated counterclockwise beyond the point to which arm 90 has been previously positioned by arm 70, contacts arm 90 and rotates arm 90, shaft 52 and gear 92 in a counterclockwise direction. On release of armature 102 by solenoid 100, springs 110, 112 return shaft 50 and plate 68 to the right, as shown in Fig. 5, releasing wheels 82, 84 and arm 80, spring 85 returning arm 80 to stop 32, and again engage wheels 72, 74 of arm 70 with driving plate 57 and stationary plate 68.

From the foregoing it can be readily seen that rotation of plates 54, 56 by motor 120 selectively rotates arms 70 and 80, depending upon the position of plate 68 under the control of solenoid 100 and armature 102. As the arms 70, 80 respectively, rotate, the extension of the arms 70, 80 are moved through an arc, the length of the arc being proportional to the time interval during which the arm is rotated which is, of course, determined by the actuation of solenoid 100. So long as the time interval and, hence, the length of the arc remains constant, arm 90 remains positioned, the extension of arms 70, 80 touching the opposite sides of member 90 at the instant plate 68 is actuated. When the time interval and, hence, the length of the arc, is changed by a variation in the actuation of solenoid 100, the arm held in engagement with the driving member by solenoid 100 for a longer time period will, of course, move through a longer arc, the extension of the driven arm moving the positioning member 90 to a new position before the driven arm is released.

As shown in Figs. 2 and 4, a shaft 140, rotatably supported in frames 24, 28, is provided with a gear segment 142, keyed to shaft 140 for rotation therewith, gear segment 142 being in mesh with gear 92. An indicator 131, provided at its outer end with a pointer 132, is fastened at its inner end to shaft 140 for rotation therewith, a scale 134 being mounted in fixed position adjacent the pointer 132. As member 90 is moved back and forth by arms 70, 80, shaft 52 is rotated, rotating gear 92, gear segment 142 and shaft 140, changing the position of indicator 131 and pointer 132 with respect to scale 134.

In operation, constant speed motor 120 of the receiver is connected in parallel with constant speed motor 4 of the transmitter, one of the leads of solenoid 100 being connected to lead 8 and the other lead to the lead 6 through contactor 10. The transmitter and receiver are synchronized so that the time lapse of one complete revolution of cam 2 by motor 4 is equal to the time lapse in the movement of arm 70 between stops 78 and 32, taking into account, of course, the width of member 90 and arm 80. In other words, the time required for each complete revolution of cam 2, and disregarding for the moment actuation of solenoid 100 and arm 80, is equal to the time required for arm 70 to move from stop 78 with arm 90 to stop 32.

With the transmitter and receiver thus synchronized, solenoid 100 is attached to contactor 10. As aforestated, actuation of contactor 10 is governed by the position of rod 12, rod 12 being positioned in accordance with the instantaneous magnitude of the variable being measured, for example, pressure, temperature or rate of flow of a liquid. Since contactor 10 controls the energization of solenoid 100 and actuation of armature 102, which, in turn, selectively engages arms 70 and 80 with driving plates 56, 54, respectively, when solenoid 100 is energized through contactor 10, arm 70 is released and, through spring 76, returns to stop 78, plate 68 contacting arm 80 with driving plate 54, moving arm 80 counterclockwise. When contactor 10 is opened, solenoid 100 is de-energized, releasing armature 102 and arm 80, re-engaging arm 70 with driving plate 57. Thus, during each complete rotation of cam 2, arm 70 and arm 80 are each rotated clockwise and counterclockwise, respectively, partially through the arc defined by stops 78, 32, the combined arcuate travel of arms 70, 80 being equal to the arcuate distance between stops 78, 32, taking into account, of course, the width of the arms and member 90.

So long as there is no change in the magnitude of the variable, rod 12 maintains its position, contactor 10 opening and closing for constant time intervals and arms 70 and 80 move clockwise and counterclockwise, respectively, through arcs of equal length. Hence, there will be no change in the position of member 90, the position of pointer 132 on scale 134 remaining fixed. Any movement by a variation in the magnitude of the variable being measured causes rod 12 to change its vertical position thereby increasing or decreasing the time interval during which contactor 10 is closed. A change in the time interval of the contactor changes the time interval during which solenoid 100 is energized, thereby changing the arc through which arms 70 and 80 are rotated, the change in the length of the arc causing the arm 70 or 80, as the case may be, to reposition arm 90 and, hence, reposition pointer 132 on scale 134.

In the above description and in Fig. 5 of the drawings, the motors 4 and 120 and the solenoid 100 are shown and described as connected to a single source of electric energy. This source may be either alternating current or direct current depending upon the type of current for which the motors and solenoid are designed. Since it is desirable that motor 4 and motor 120 rotate at constant speed, it is preferred to connect the motors 4 and 120 in parallel to the same energy source to insure that the duration of each transmitter cycle is the same as the duration of each receiver cycle. However, solenoid 100 may be connected to a different energy source than are the motors 4 and 120. For example, motors 4 and 120, as shown in Fig. 5, may be connected to an alternating current source and solenoid 100 may be connected to a direct current source. In such an arrangement, one of the leads from the solenoid 100 is connected directly to one of the terminals of a direct current source, for example, a battery or batteries, and the other lead of solenoid 100 is connected to the other direct current terminal through the contactor 10 and cam 2. In such an arrangement, lead 22 is connected to the direct current terminal rather than to the lead 6 as shown in Fig. 5.

From the foregoing description, it can be seen a compact telemetric receiver is provided for use with a telemetric transmitter. Due to the planetary arrangement of the driving parts of the receiver, a compact and lightweight system is provided which indicates variations in the variable under measurement. In order to prevent damage resulting from over-load in the event some portion of the system should fail, a stallable type of motor is preferred on the receiver. Such a motor will not be damaged, although energized when stalled.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A remote controlled indicator comprising an indicating element movable back and forth and adapted to remain positioned, a positioning member operatively connected to said element and movable between two predetermined points for positioning said element, a first driving mechanism for driving said member from the first of said predetermined points toward the second of said predetermined points, a second driving mechanism for driving said member from said second point toward said first point, means connected to said first driving mechanism for driving said first driving mechanism at a constant speed, and means for selectively disconnecting said driving means from driving engagement with said first driving mechanism and for connecting said driving means to said second driving mechanism for driving said second driving mechanism at a constant speed.

2. An indicator adapted to be controlled by impulses from a point remote from the indicator, said indicator comprising an element movable back and forth and adapted to remain positioned, a positioning member operatively connected to said element and movable between two predetermined points for positioning said element, a first arm for moving said positioning member from the first of said points toward the second of said points, a second arm for moving said positioning member from said second point toward said first point, a first driving means adjacent said first arm, a second driving means adjacent said second arm, a motor connected to said first driving means and to said second driving means for driving said first and second driving means at a constant speed, means carried by said first arm engageable with said first driving means for moving said first arm, means carried by said second arm engageable with said second driving means for moving said second arm, and means for alternately engaging said means carried by said first arm and said second arm with the said first and said second driving means, respectively.

3. An indicator adapted to be controlled by impulses from a point remote from the indicator, said indicator comprising an element movable back and forth and adapted to remain positioned, a positioning member operatively connected to said element and movable between two predetermined points for positioning said element, a shaft, a first rotatable member mounted on said shaft, a second rotatable member mounted on said shaft and spaced axially from said first rotatable member, a plate on said shaft intermediate said first and said second rotatable members, a first arm rotatably mounted on said shaft intermediate said first rotatable member and said plate and engageable with said positioning member for moving said positioning member in one direction, means carried on said first arm for engagement with said first rotatable member, a second arm rotatably mounted on said shaft intermediate said second rotatable member and said plate and engageable with said positioning member for moving said positioning member in an opposite direction, means carried on said second arm for engagement with said second rotatable member, a motor connected to said first rotatable member and said second rotatable member for rotating said rotatable members in opposite directions, and means for moving said plate to a first position to engage said means carried on said first arm with said first rotatable member and to a second position to engage said means carried on said second arm with said second rotatable member.

4. An indicator adapted to be controlled by impulses from a point remote from the indicator, said indicator comprising an element movable back and forth between two predetermined points and adapted to remain positioned between said points, a positioning member operatively connected to said element for positioning said element between said predetermined points, a shaft, a first rotatable member mounted on said shaft, a second rotatable member mounted on said shaft and spaced axially from said first rotatable member, a plate fixed to said shaft intermediate said first and said second rotatable members, a first arm rotatably mounted on said shaft intermediate said first rotatable member and said plate and engageable with said positioning member to move said member in one direction, means carried on said first arm engageable with said first rotatable member, a second arm rotatably mounted on said shaft intermediate said second rotatable member and said plate and engageable with said positioning member for moving said member in an opposite direction, means carried on said second arm for engagement with said second rotatable member, a motor connected to said first rotatable member and said second rotatable member for rotating said rotatable members in opposite directions, and means connected to said shaft for moving said shaft and said plate to a first position to engage said means carried on said first arm with said first rotatable member and to a second position to engage said means carried on said second arm with said second rotatable member.

5. An indicator adapted to be controlled by impulses from a piont remote from the indicator, said indicator comprising an element movable back and forth and adapted to remain positioned, a positioning member operatively connected to said element and movable between a first stop and a second stop for positioning said element, a shaft, a first rotatable member mounted on said shaft, a second rotatable member mounted on said shaft and spaced axially thereon from said first rotatable member, a plate fixed to said shaft intermediate said first and said second rotatable members, a first arm rotatably mounted on said shaft intermediate said first rotatable member and said plate and engageable with said positioning member to move said member from said first stop toward said second stop, means carried on said first arm engageable with said first rotatable member and one side of said plate, a second arm rotatably mounted on said shaft intermediate said second rotatable member and said plate and engageable with said positioning member to move said member from said second stop toward said first stop, means carried on said second arm for engagement with said second rotatable member and the opposite side of said plate, a motor connected to said first rotatable member and said second rotatable member for rotating said rotatable members in opposite directions, and means connected to said shaft for moving said shaft and said plate axially of said first and said second rotatable members to alternately engage said means carried by said first arm and said second arm with said first and said second rotatable members, respectively.

6. An indicator adapted to be controlled by impulses from a point remote from the indicator, said indicator comprising an element movable back and forth and adapted to remain positioned, a positioning member operatively connected to said element and movable between a first stop and a second stop for positioning said element, a shaft, a first rotatable member mounted on said shaft, a second rotatable member mounted on said shaft and spaced axially thereon from said first rotatable member, means between said first and said second rotatable members for maintaining said rotatable members axially spaced on said shaft, a plate fixed to said shaft intermediate said first and said second rotatable members, a first arm rotatably mounted on said shaft intermediate said first rotatable member and said plate and engageable with said positioning member to move said member from said first stop toward said second stop, means carried on said first arm engageable with said first rotatable member and one side of said plate, a second arm rotatably mounted on said shaft intermediate said second rotatable member and said plate and engageable with said positioning member to move said member from said second stop toward said first stop, means carried on said second arm for engagement with said second rotatable member and the opposite side of said plate, a motor connected to said first rotatable member and said second rotatable member for rotating said rotatable members in opposite directions, and means connected to said shaft for moving said shaft and said plate axially of said first and said second rotatable members to alternately engage said means carried by said first arm and said second arm with said first and said second rotatable members, respectively.

7. An indicator adapted to be controlled by impulses from a point remote from the indicator, said indicator comprising an element movable back and forth and adapted to remain positioned, a positioning member operatively connected to said element and movable between a first stop and a second stop for positioning said element, a shaft, a first rotatable member mounted on said shaft, a second rotatable member mounted on said shaft and spaced axially thereon from said first rotatable member, a plate fixed to said shaft intermediate said first and said second rotatable members, a first arm rotatably mounted on said shaft intermediate said first rotatable member and said plate and engageable with said positioning member to move said member from said first stop toward said second stop, means carried on said first arm engageable with said first rotatable member and one side of said plate, a second arm rotatably mounted on said shaft intermediate said second rotatable member and said plate and engageable with said positioning member to move said member from said second stop toward said first stop, means carried on said second arm for engagement with said second rotatable member and the opposite side of said plate, a motor connected to said first rotatable member and said second rotatable member for rotating said rotatable members in opposite directions, means connected to said shaft for moving said shaft and said plate axially of said first and said second rotatable members to alternately engage said means carried by said first arm and said second arm with said first and said second rotatable members, respectively, means for returning said first arm to said first stop when said means carried by said first arm is disengaged from said first rotatable member, and means for returning said second arm to said second stop when said means carried by said second arm is disengaged from said second rotatable means.

8. An indicator adapted to be controlled by impulses from a point remote from the indicator, said indicator comprising an element movable back and forth and adapted to remain positioned, a first shaft fixed to said element, a gear segment fixed to said shaft, a second shaft, a gear rotatably mounted on said second shaft, a positioning member rotatably mounted on said second shaft and attached to said gear, a first rotatable member mounted on said shaft, a second rotatable member mounted on said shaft and spaced axially thereon from said first rotatable member, a plate fixed to said shaft intermediate said first and said second rotatable members, a first arm rotatably mounted on said shaft intermediate said first rotatable member and said plate and engageable with said positioning member to move said member in a first direction, means carried on said first arm between said first rotatable member and said plate for engagement therewith, a second arm rotatably mounted on said shaft intermediate said second rotatable member and said plate and engageable with said positioning member to move said member in a second direction, means carried on said second arm between said second rotatable member and said plate for engagement therewith, a motor, resilient means connected to said second shaft for moving said second shaft and said plate axially of said first and said second rotatable members to engage said means carried by said first arm between said first rotatable member and said plate to thereby drive said first arm in one direction, and means connected to said second shaft for moving said second shaft and said plate axially against the force of said resilient means to release said means carried by said first arm from engagement between said first rotatable member and said plate and to engage said means carried by said second arm between said second rotatable member and said plate to thereby drive said second arm in the opposite direction.

References Cited in the file of this patent

UNITED STATES PATENTS

| | | |
|---|---|---|
| 1,588,399 | Anderson | June 15, 1926 |
| 2,489,474 | Andren | Nov. 29, 1949 |